(12) United States Patent
Billingsley et al.

(10) Patent No.: US 7,139,916 B2
(45) Date of Patent: Nov. 21, 2006

(54) METHOD AND SYSTEM FOR MONITORING USER INTERACTION WITH A COMPUTER

(75) Inventors: Eric N. Billingsley, Los Gatos, CA (US); Louis M. Monier, Menlo Park, CA (US)

(73) Assignee: eBay, Inc., San Jose, CA (US)

( * ) Notice: Subject to any disclaimer, the term of this patent is extended or adjusted under 35 U.S.C. 154(b) by 730 days.

(21) Appl. No.: 10/186,637

(22) Filed: Jun. 28, 2002

(65) Prior Publication Data

US 2004/0003258 A1    Jan. 1, 2004

(51) Int. Cl.
| | |
|---|---|
| H04K 1/00 | (2006.01) |
| G06F 17/30 | (2006.01) |
| G06F 11/00 | (2006.01) |
| G06K 9/00 | (2006.01) |
| G06K 7/00 | (2006.01) |

(52) U.S. Cl. .................. 713/182; 726/26; 726/22; 380/255; 382/100; 382/312

(58) Field of Classification Search ........ 717/100–106, 717/109; 714/38; 715/848; 345/667
See application file for complete search history.

(56) References Cited

U.S. PATENT DOCUMENTS

| | | | |
|---|---|---|---|
| 4,695,966 A | 9/1987 | Takakura et al. | |
| 4,949,391 A | 8/1990 | Faulkerson et al. | |
| 5,539,868 A | 7/1996 | Hosoya et al. | |
| 6,037,984 A | 3/2000 | Isnardi et al. | |
| 6,195,698 B1 | 2/2001 | Lillibridge et al. | |
| 6,243,093 B1 * | 6/2001 | Czerwinski et al. | ........ 715/848 |
| 6,266,158 B1 | 7/2001 | Hata et al. | |
| 6,292,575 B1 | 9/2001 | Bortolussi | |
| 6,397,355 B1 * | 5/2002 | Curtis et al. | .................. 714/38 |
| 6,618,117 B1 * | 9/2003 | Silverbrook | ................. 355/18 |
| 6,636,216 B1 * | 10/2003 | Silverbrook et al. | ........ 345/427 |
| 6,721,423 B1 | 4/2004 | Anderson et al. | |
| 6,750,944 B1 * | 6/2004 | Silverbrook et al. | .......... 355/18 |
| 6,763,515 B1 * | 7/2004 | Vazquez et al. | ............ 717/109 |
| 6,829,748 B1 | 12/2004 | Browne et al. | |
| 6,868,539 B1 * | 3/2005 | Travison et al. | ............ 717/100 |
| 6,895,507 B1 * | 5/2005 | Teppler | ....................... 726/19 |
| 6,947,557 B1 * | 9/2005 | Megiddo et al. | .............. 380/30 |
| 2001/0037468 A1 | 11/2001 | Gaddis | |
| 2004/0003258 A1 | 1/2004 | Billingsley et al. | |
| 2004/0199597 A1 | 10/2004 | Libbey et al. | |
| 2005/0140675 A1 | 6/2005 | Billingsley et al. | |
| 2005/0198580 A1 | 9/2005 | Hua | |

OTHER PUBLICATIONS

MicroSoft Press Computer Dictionary, Third Edition, published on 1997.*
Search Report, "International Searching Authority", *PCT/US03/20457*, (Jun. 27, 2003).

(Continued)

*Primary Examiner*—Antony Nguyen-Ba
(74) *Attorney, Agent, or Firm*—Schwegman, Lundberg, Woessner & Kluth, P.A.

(57) ABSTRACT

A method of, and system for, monitoring interaction between a user and a computer is provided. The method includes generating an image including random reference data readable by the user, and communicating the image to the computer for display to the user. User input data is then received and a comparison between the random reference data and the user input data is performed to determine if the user is interacting with the computer.

27 Claims, 7 Drawing Sheets

OTHER PUBLICATIONS

Byron Spice, "Robot Solves Internet robot problem", Post-gazette.com/PG News, Oct. 21, 2001, Health & Science, PG Publishing.

The Captcha Project, "Telling Humans and Computers Apart (Automatically)", Captcha.net, 2000, Carnegie Mellon School of Computer Science.

Baird, Henry S., et al., "Protecting Websites with Reading-Based CAPTCHAs", *2nd International Web Document Analysis Workshop (WDA'03)*, (Aug. 3, 2003),53-56.

Chew, Monica, et al., "BaffleText: a human interactive proof (5010-40)", *Document recognition and retrieval-Annual conference: 10th Proceedings SPIE The International Society for Optical Engineering*, (2003),305-316.

Courter, Gini, et al., *Mastering Microsoft (R) Office 2000 Professional Edition*, San Francisco : Sybex Inc.,(1999),pp. 5-7, 70-71, 151-157.

Matthias, Colin E., et al., "Blocking Techniques Against Malicious Robots", *Major Qualifying Project Report submitted to the Faculty of the Worcester Polytechnic Institute*, (Mar. 7, 2003),1-39.

Simard, Patrice Y., "Using Character Recognition and Segmentation to Tell Computer from Humans", *Proceeding of the Seventh International Conference on Document Analysis and Recognition*, (Aug. 3-6, 2003),418-423.

Von Ahn, Luis, "Telling Humans and Computers Apart (Automatically) or How Lazy Cryptographers do AI", *Communications of the ACM*, 47(2), (Feb. 2004),56-60.

\* cited by examiner

METHOD AND SYSTEM FOR MONITORING USER INTERACTION WITH A COMPUTER

FIELD OF THE INVENTION

The invention relates to monitoring user interaction with a computer.

BACKGROUND OF THE INVENTION

A problem that often arises in an Internet environment is that of unauthorized or improper access to web sites by robots, commonly referred to as "bots". Bots are programs that are run on computers that automatically access a web site without the need for user interaction. Although some bots may access a web site for proper purposes, e.g., search engine spiders that are authorized to scrape information from web pages, other bots perform improper functions. For example, certain bots access web sites and register multiple fictitious users for improper purposes, access web site to mine confidential user information, guess user passwords, list items without authorization on sale or auction web sites, and so on. It will be appreciated that, due to the high processing power of computers running bots, a large number of unauthorized accesses may take place in an extremely short period of time. However, although unauthorized access by a user or human may still occur, it is a substantially slower process.

SUMMARY OF THE INVENTION

A method of, and system for, monitoring interaction between a user and a computer are provided. The method includes generating an image including random reference data readable by the user, and communicating the image to the computer for display to the user. User input data is then received and a comparison between the random reference data and the user input data is performed to determine if the user is interacting with the computer.

Other features of the present invention will be apparent from the accompanying drawings and from the detailed description, which follows.

BRIEF DESCRIPTION OF THE DRAWINGS

The present invention is illustrated by way of example, and not limitation, in the figures of the accompanying drawings, in which like references indicate similar features.

In the drawings.

DETAILED DESCRIPTION

A method of, and system for, monitoring user interaction with a computer are described. In the following description, for purposes of explanation, numerous specific details are set forth in order to provide a thorough understanding of the present invention. It will be evident, however, to one skilled in the art that the present invention may be practiced without these specific details.

Figure 1:
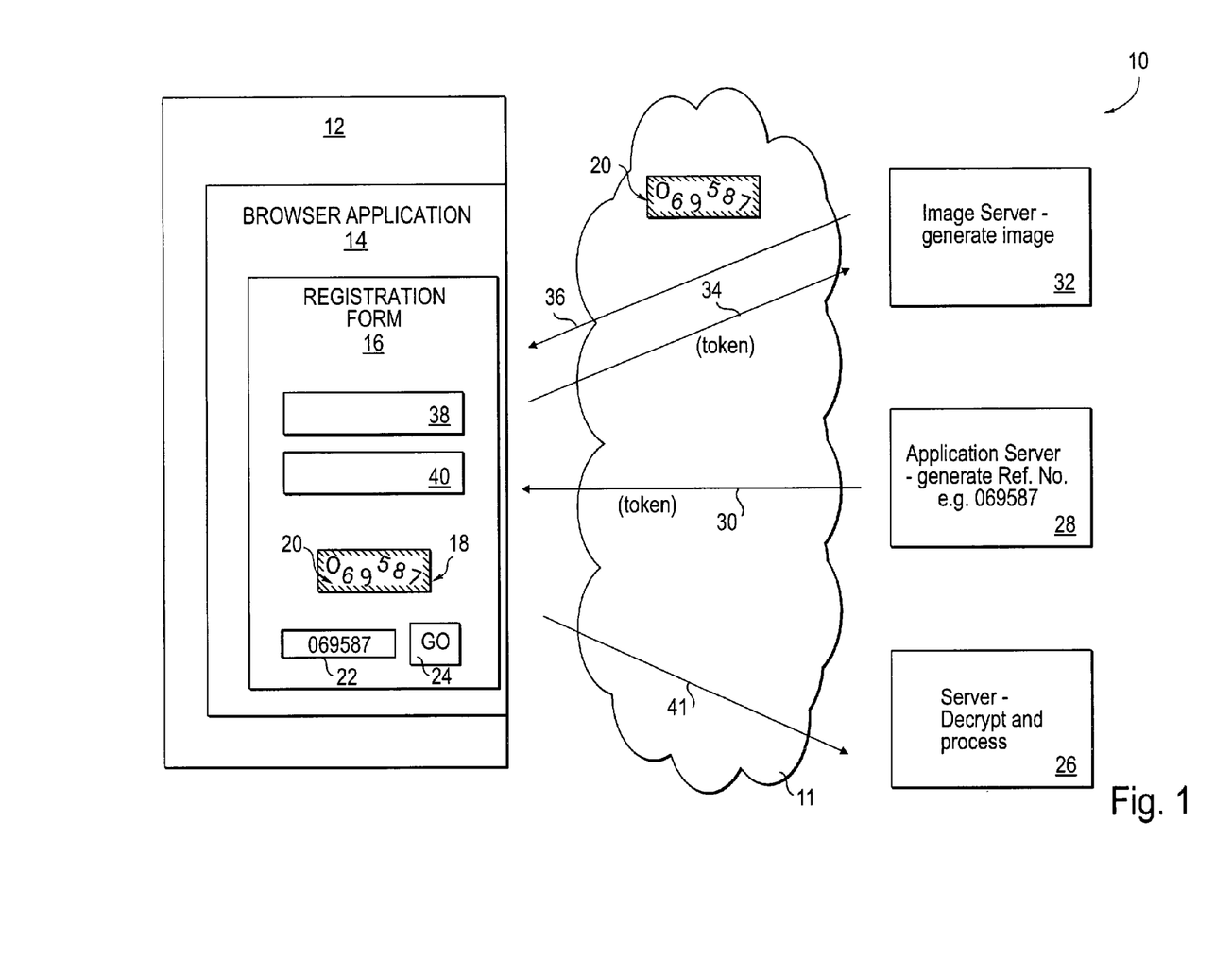
FIG. 1 shows a schematic block diagram of an exemplary system, in accordance with one aspect of the invention, for monitoring interaction between a user and a computer.

Referring in particular to FIG. 1, reference numeral 10 generally indicates a system, in accordance with an aspect of the invention, for monitoring user interaction with a computer 12. In one embodiment of the invention, the system 10 is used in an Internet environment where a user accesses a web site of an Internet service facility. Accordingly, the invention is described with reference to a user registration process via the Internet 11. However, it should be appreciated that the invention may be applied in any computer environment in which user interaction with the computer is to be monitored.

The computer 12 includes a web browser application 14, which generates a user interface such as an exemplary registration form 16. The registration form 16 includes a display zone 18 for displaying an image 20 including a random reference number and, in order to effect registration, a user is required to read the random reference number from the image 20 and enter it into a user data input field 22. In order to complete registration, the user activates a "GO" button 24 which then communicates the registration information to a registration server 26. As described in more detail below, the image 20 is distorted and modified to inhibit the acquisition of the reference number by an automated process such as a software robot using optical character recognition (OCR). However, the image 20 is sufficiently clear so that the user may read the reference number for entry into the input data field 22. Thus, in order to effect registration, human interaction with the computer 12 is required.

In one embodiment, the reference number is generated by an Internet application server 28, which passes the random number in reference data, e.g., in the form of a token, via the Internet 11 to the browser application 14 as shown by arrow 30. The browser application 14 then passes the token to an image server 32, as shown by arrow 34, during a HyperText Markup Language (HTML) image call. The image server 32 then decrypts the token and includes the reference number in the image 20 in a random fashion whereafter it is communicated, as shown by line 36, to the browser application 14 for inclusion in the display zone 18. After the user has entered the number into the user data input field 22, and completed other details in the registration form, e.g. completed details in the fields 38, 40, the token and the user input data in the field 22 are then communicated to the registration server 26. The registration server 26 then decrypts the token to obtain the reference number, and then compares the number entered by the user with the reference number and, if the numbers match, the registration server 26 may authenticate the user. However, in addition to comparing the two numbers, the registration server 26 also performs a checksum validation and time stamp analysis of the token, as described in more detail below.

Figure 2:
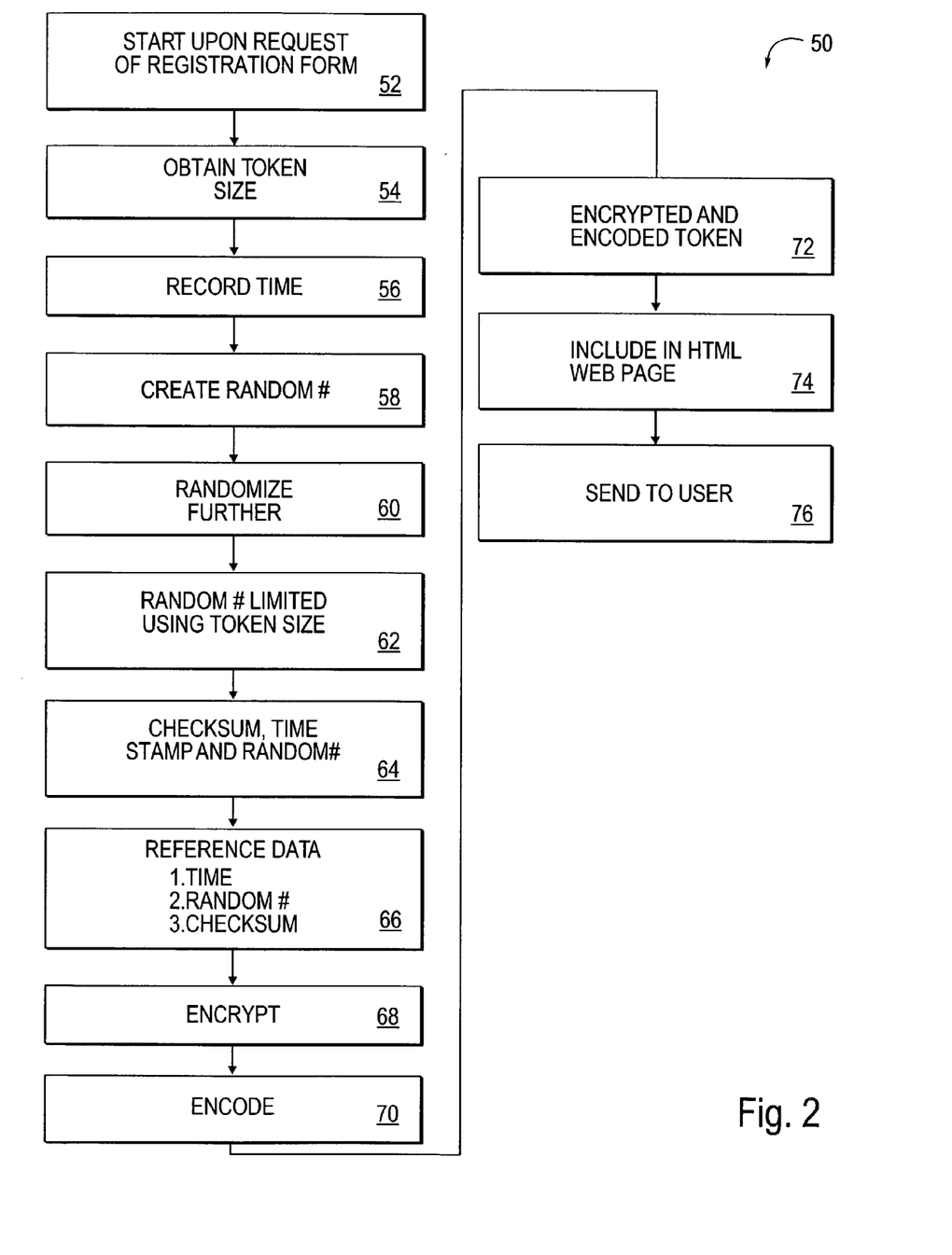
FIG. 2 shows a schematic flow diagram of an exemplary method, in accordance with another aspect of the invention, of generating reference data including a random reference string.

Referring in particular to FIG. 2, reference numeral 50 generally indicates an exemplary method, in accordance with an aspect of the invention, for generating random reference data including a reference string in the exemplary form of a random reference number, for inclusion in the image 20. In one embodiment, the method 50 is carried out in the application server 28. It is to be appreciated that, although the random reference string is in the form of a random reference number, in other embodiments, the random reference string may be numeric, alphanumeric characters and/or any graphical data. However, when the random reference string is in the form of a random number with numerical digits, the system 10 may be language independent.

In an exemplary registration process, the method 50 is initiated when the web browser application 14 requests a registration form from the application server 28 (see block 52). Thereafter, as shown at block 54, the particular token size, to convey the reference data, in the system 10 is determined and is time stamped in milliseconds (see block 56). The random reference number is generated as shown at block 58 and further randomized as shown at block 60. Thereafter, the reference number is limited in size (see block 62) to conform to the token size selected at block 54. A checksum of the time stamp and the reference number is then performed (see block 64) to produce reference data including time data, the reference number, and the checksum (see block 66) which is then encrypted, e.g. using Blowfish, as shown in block 68. The encrypted reference data is then Base64 encoded (see block 70) to produce an encrypted and encoded token (see block 72) which is then included in an HTML web page (see block 74) and sent to the user (see block 76 in FIG. 2 and arrow 30 in FIG. 1).

An example of the token including the reference data generated by the application server 28 is as follows:

| (64 bit) | (32 bit) | (32 bit) |
|---|---|---|
| 1595139460 | 069587 | 59991 |
| Time Stamp | Random # | Checksum |

The time stamp of the token (see block 56 in FIG. 2) indicates when the token was generated and, as described in more detail below, is used by the server 26 to determine whether or not the token has been used before in a valid registration process. The time stamp is typically the time on the application server 28 when the token was created.

Although in the embodiment described above, the token is communicated to the browser application 14 in an HTML web page, it is to be appreciated that it may also, in other embodiments, be passed in a cookie, in other forms, URLs, or the like. Further, the encryption of the token is typically by means of a private key and the random number is generated on-the-fly or dynamically when a request for the registration form 16 is received from the browser application 14. Accordingly, in one embodiment, no library of numbers or images is provided, and different reference data including the random number, is generated each time a request from the computer 12 is processed.

Figure 3:
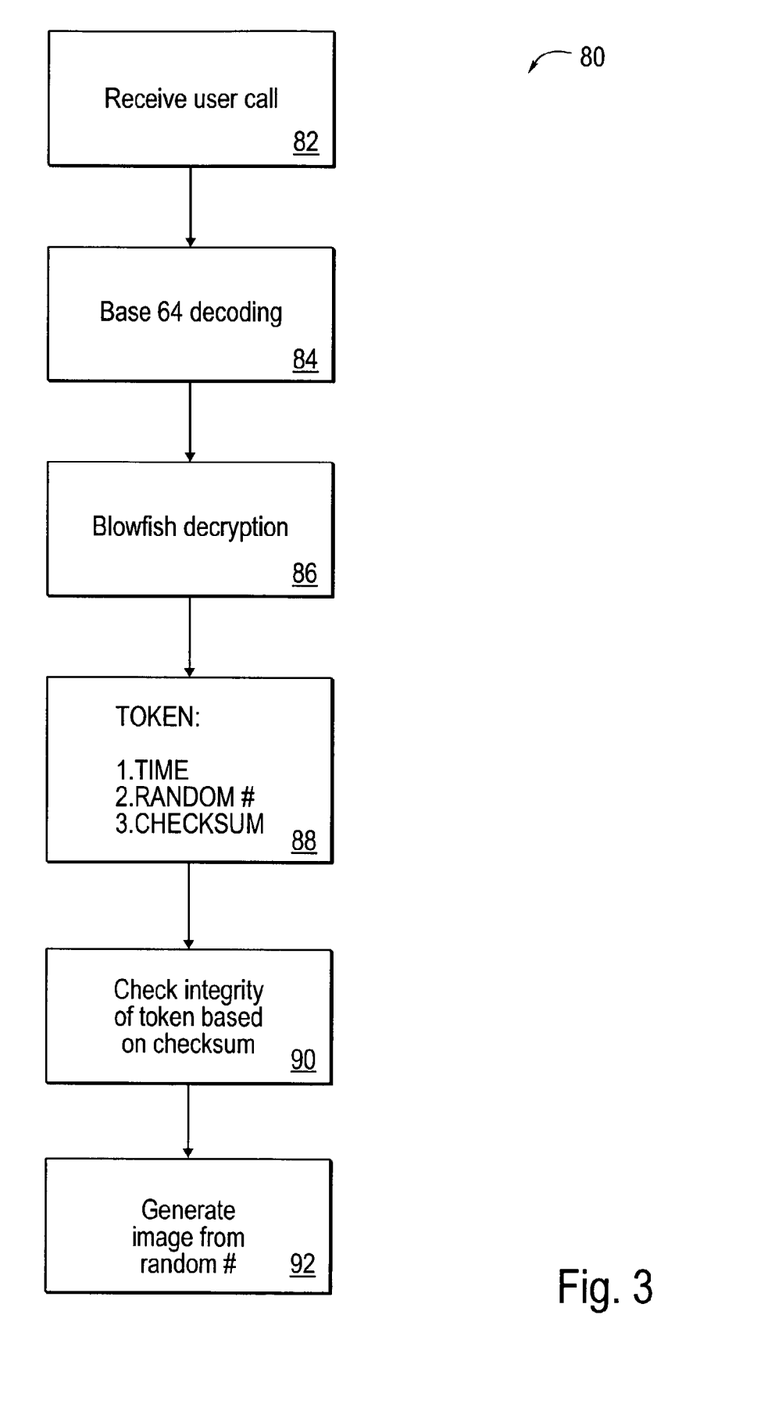
FIG. 3 shows a schematic flow diagram of an exemplary method, also in accordance with an aspect of the invention, of generating an image, readable by the user, including the random reference string.

When the browser application 14 performs an image call to the image server 32 to retrieve the image 20 for display in the web page received from the application server 28, it passes the encrypted and encoded token received from the application server 28, to the image server 32 as shown by the arrow 34 in FIG. 1. Referring in particular to FIG. 3 of the drawings, reference numeral 80 generally indicates an exemplary method, in accordance with a further aspect of the invention, for generating the image 20. As shown at block 82, the image server 32 receives the user call from the browser application 14 and identifies the token with the reference data and decodes the reference data using Base64 decoding (see block 84). Thereafter, the reference data is decrypted using Blowfish (see block 86) to obtain decoded and decrypted reference data including the time data, the reference number, and the checksum as shown at block 88. The integrity of the reference data is then checked based on the checksum as shown at block 90 whereafter the image 20 is generated.

Figure 4:
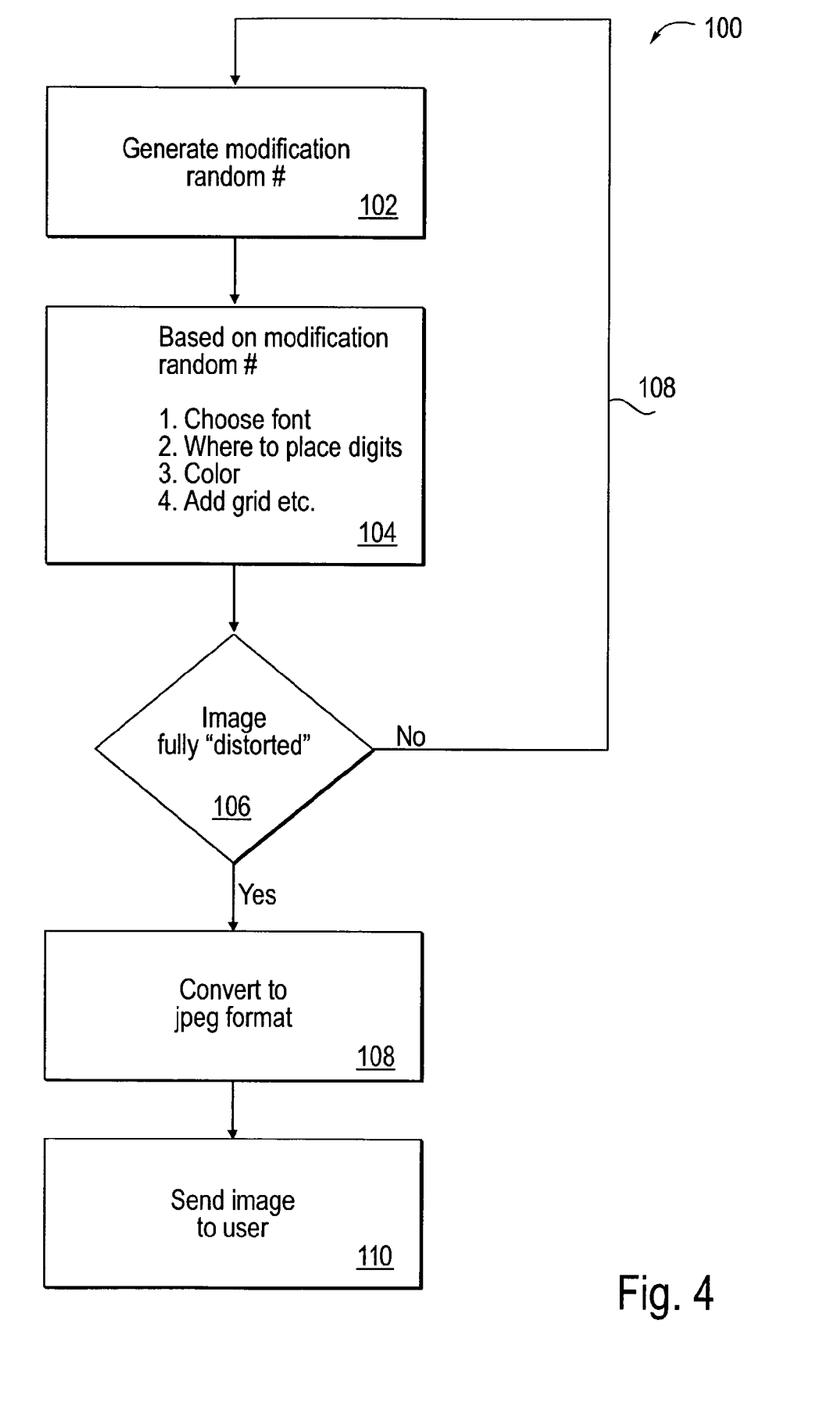
FIG. 4 shows a more detailed schematic flow diagram of the method of FIG. 3 showing inclusion of the random reference string in the image.

Referring in particular to FIG. 4, reference numeral 100 generally indicates an exemplary method, in accordance with an aspect of the invention, for generating the random image 20 including the random reference number. As shown at block 102, an image modification random number is generated at the image server 32 and, based on the image modification random number, the image is then created and modified. For example, the image modification random number may be used randomly to select one of a plurality of different fonts (see block 104) for each digit in the reference number thereby to inhibit the acquisition of the number by a robot. In one embodiment, a plurality of image modification random numbers may be iteratively generated, as shown by block 106 and line 108, and, in response to each random number, the position in the image 20 in which each digit is displayed may be randomly off-centered, various colors in which the digit is to be displayed may be randomly generated, a grid may be added to the image 20, random distortion or noise may be added to the image 20, and so on (see block 104). Once the image 20 has been sufficiently distorted, it is then converted to a jpeg format (see block 108) whereafter it is sent to the computer 12 as shown at block 110 in FIG. 4 and by the arrow 36 in FIG. 1.

In one embodiment, it is to be appreciated that as the image modification number is a random number, the image not only includes the random reference number, but also includes the number within the image in a random fashion. In one embodiment, the image is distorted or modified so that a modicum of human interpretation is required to assimilate or identify the reference number.

As mentioned above, the browser application 14 displays the image 20 in the display zone 18 so that the user may read the numbers provided therein and manually enter the digits, into the entry form or field 22 via a keyboard of the computer 12. Once the user has completed the entire registration form, the user typically activates the "GO" button 24 in response to which the browser application 14 communicates the user entered data, data entered into the form 16, and the token including the reference data to the server 26 as shown by arrow 41 in FIG. 1.

Figure 5:
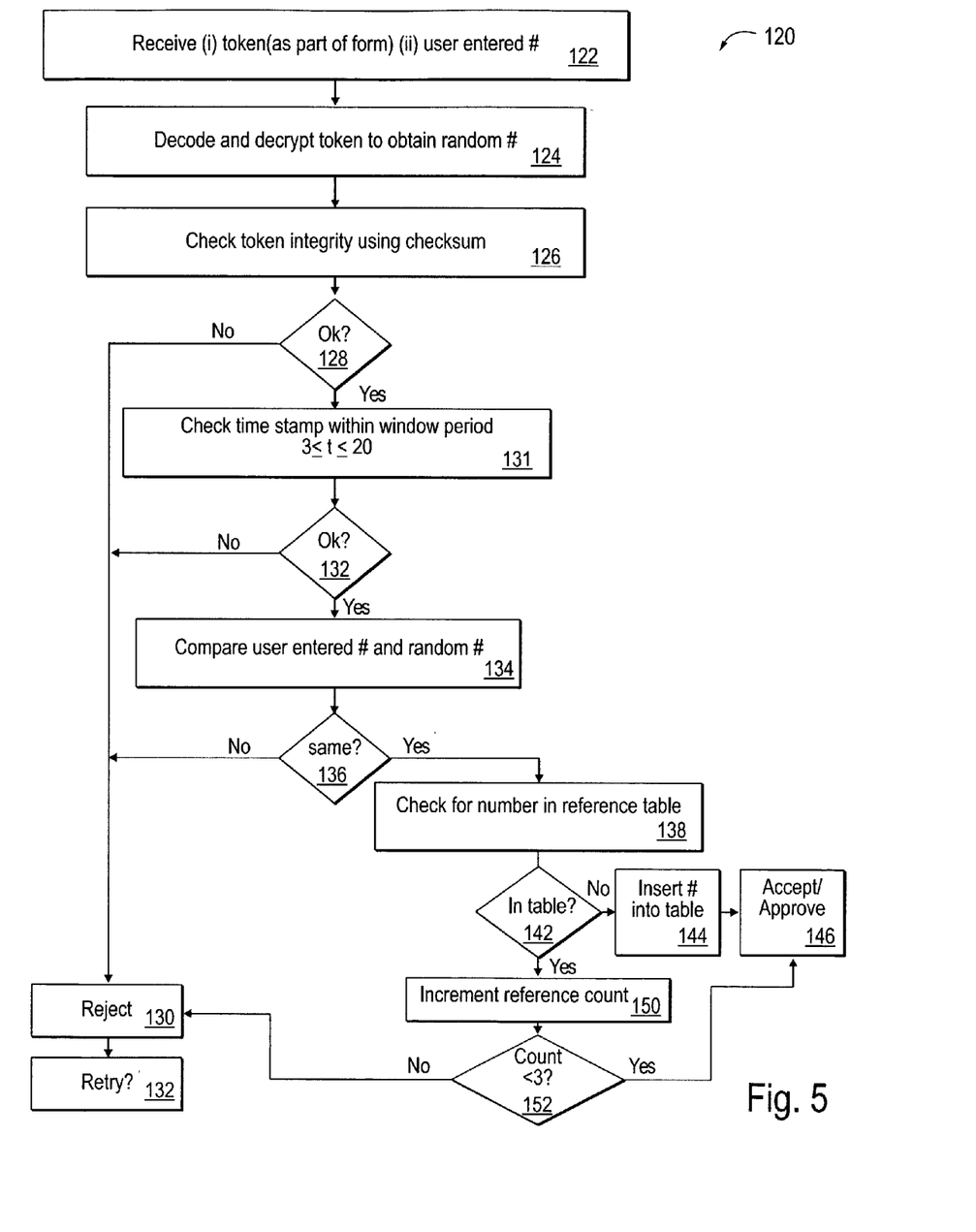
FIG. 5 shows a schematic flow diagram of an exemplary method, also in accordance with an aspect of the invention, of monitoring user interaction with the computer.

Referring in particular to FIG. 5, reference numeral 120 generally indicates an exemplary method, in accordance with an aspect of the invention, for monitoring user interaction with the computer 12. As shown at block 122, in one embodiment the server 26 receives the token including the reference data, as part of the form 16, as well as the user entered number. The reference data of the token is then Base64 decoded and Blowfish decrypted to obtain the reference data including the random reference number (see block 124). As in the case of the server 32, the integrity of the reference data is then checked using the checksum (see block 126) and, as shown at decision block 128, if the integrity of the reference data of the token is rejected (see block 130), the user is then given a further opportunity of a limited number of opportunities (see block 132) to re-enter the number which is shown in the image 20.

However, returning to decision block 128, if the integrity of the reference data is accepted, then the time stamp of the token is checked to ensure that it is within a particular predetermined time range or window period as shown at block 131. In particular, and depending upon the amount of detail a user is required to enter into the registration form 16, a window period of about 3 to 20 minutes is allowed during which the reference data of the token is valid. If the time stamp indicates a time period of less than about 3 minutes or a time period of more than about 20 minutes, it is assumed that the registration attempt is either by a robot, or a replay attack in which multiple registration attempts using the same token are attempted. Accordingly, as shown at decision block 132, if the time stamp of the token is not within the window period, the registration attempt is rejected (see block 130).

However, if the time stamp is within the acceptable window period, the user entered number is compared with the reference number to see if they match, as shown at block 134. If the user entered number and the reference number do not match (see block 136) then the registration attempt is rejected (see block 130). In the embodiment depicted in the drawings in which the application server 28 performs the time stamping and the registration server 26 checks the time stamping, time on the servers 26, 28 is synchronized.

In certain circumstances, a user may inadvertently activate the "GO" button 24 more than once, for example, due to a slow refresh rate on a display screen. Thus, in certain embodiments, the reference data may be valid for more than one perceived registration attempt. In these circumstances, if the user entered number and the reference number match, a further check is conducted to determine if the same token has already been used as a basis for a registration validation (see block 138). In particular, the method 120 accesses a table 140 (see FIG. 8) to obtain usage information on the token and its reference data. As shown at decision block 142 in FIG. 5, if the number of the token is not included in the table 140, it is then inserted into the table 140 (see block 144) and its reference count is set at "1" (see column 148 in FIG. 8). Thereafter, the registration process is authenticated or effected, as shown at block 146.

Figures 7, 8:
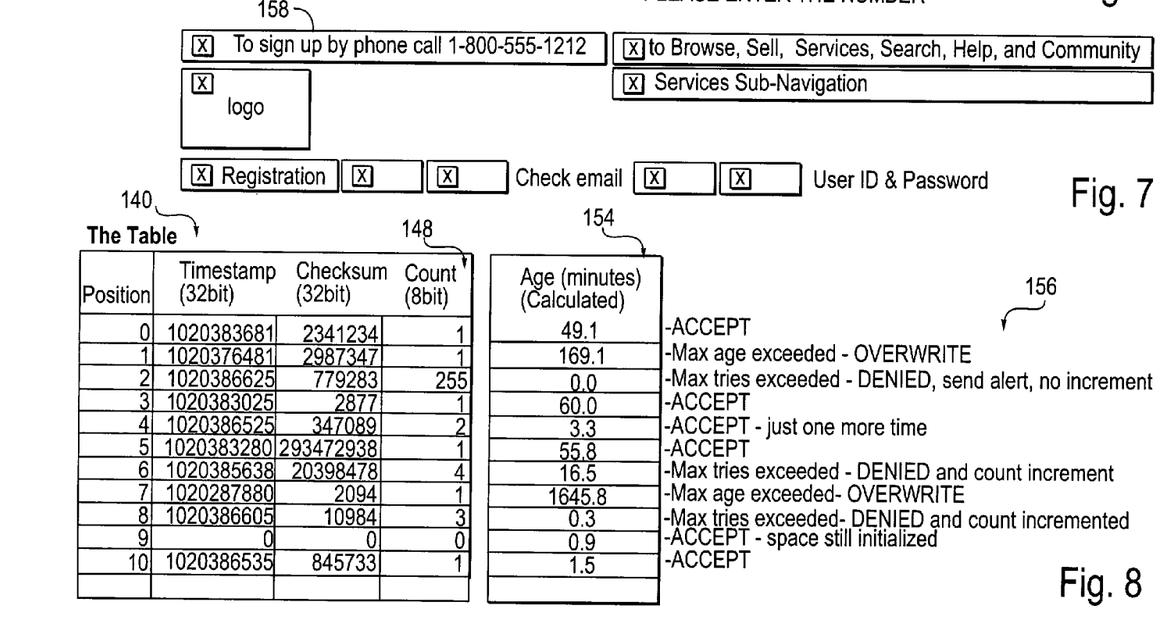
FIG. 7 shows an exemplary user interface for a visually impaired user.
FIG. 8 shows an exemplary table for monitoring repetitive use of a token.

However, returning to decision block 142, if the reference number associated with the token is included in the table 140, its reference count included in column 148 is incremented (see block 150) and the method 120 then checks to see if the count associated with the token exceeds a predetermined maximum number. For example, if the predetermined maximum number is three, then once the count in the table 140 has reached three, any registration attempt after that using the same reference number is rejected (see blocks 152 and 130 in FIG. 5). If, however, the account is less than three, then the registration process may be completed (see block 146).

In certain embodiments, the table 140 includes an age column 154, which is used to check whether or not the time stamp is within the predetermined window period (see block 131). A registration attempt may be selectively rejected dependent upon the count in column 148 and the age of the token as shown in column 154. Comments 156 in FIG. 8 show an exemplary application of the methodology described above in which the time window is 120 minutes and the maximum number of retry attempts using the same reference data is three.

Figure 6:
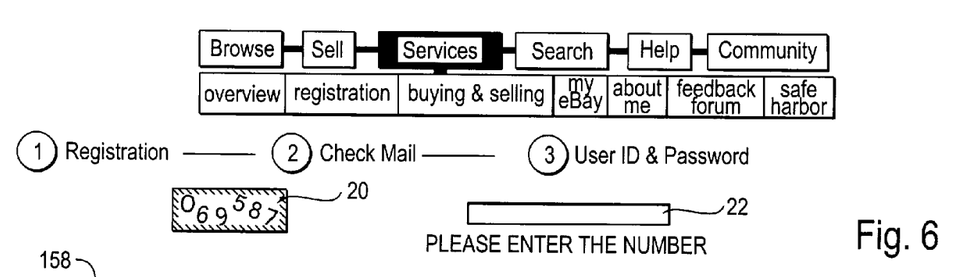
FIG. 6 shows a schematic representation of an exemplary user interface presented to the user on the computer.

An exemplary screen shot of an embodiment of a user interface served by the application server 28 to the browser application 14 is shown in FIG. 6. The user interface of FIG. 6 is typically generated using HTML and, as mentioned above, although the invention is described with reference to a registration process, it may be used to monitor user interaction with the computer 12 in any other circumstances. As the image 20 is modified in such a fashion that it inhibits identification of the reference number by a robot or any other automated process, the resultant image 20 may be difficult for a visually impaired person to read. Accordingly, as shown in FIG. 7, an alternative sign up or registration procedure may be provided in which a toll free number 158 is provided for a visually impaired person to call and thereby to effect registration.

In the embodiments described above, the servers 26, 28, and 32 are shown as separate servers, which may be located at different facilities. Thus, in one embodiment, the token communicated between the different servers may be the only interaction between the servers 26, 28, 32. In this embodiment, a single centralized table 140 may be provided on the server 26 and it need not be replicated on the servers 28 and 32. However, it will be appreciated that in other embodiments, any two or more of the servers may be combined into a single server.

Figure 9:
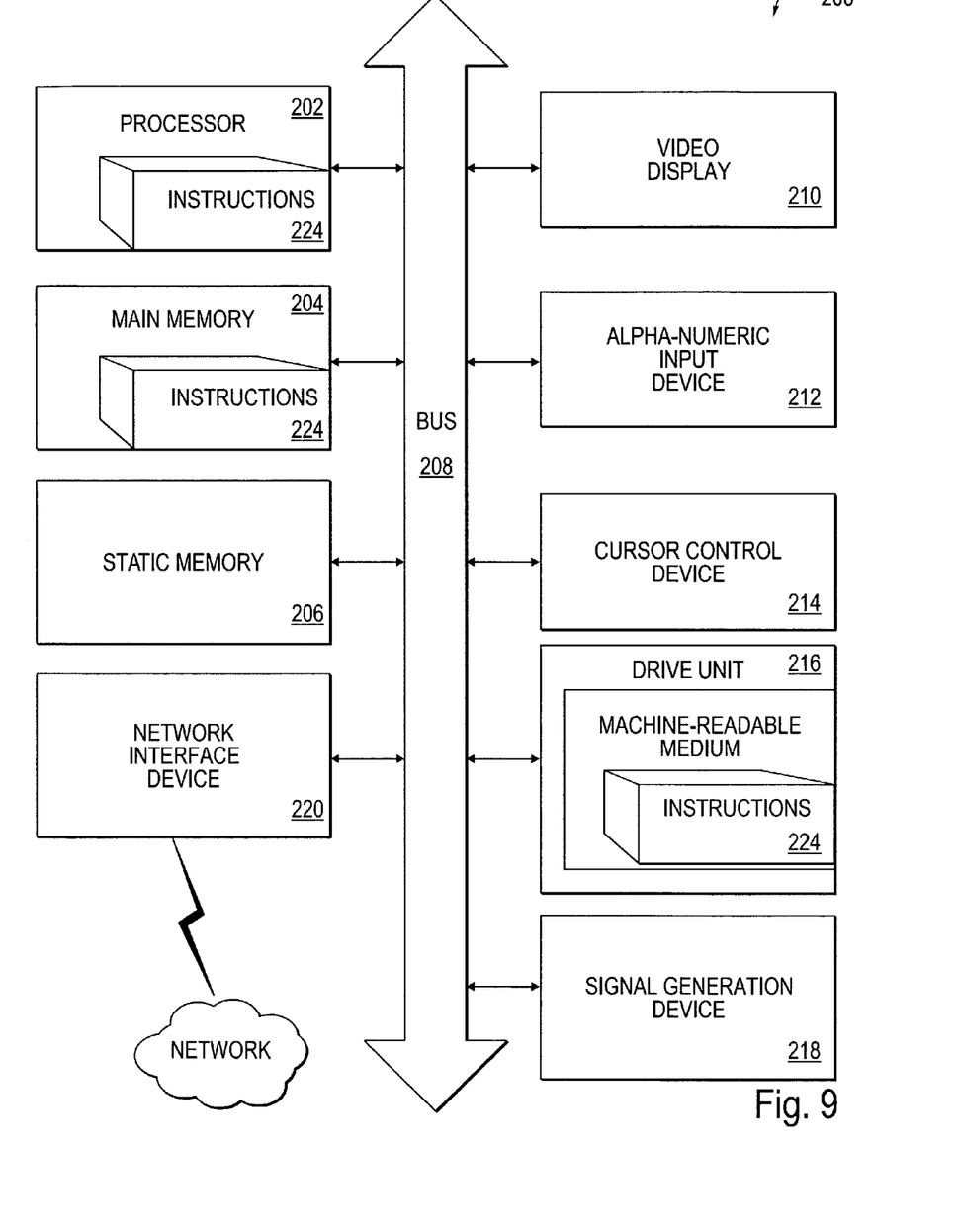
FIG. 9 shows schematic hardware architecture of an exemplary computer.

FIG. 9 shows a diagrammatic representation of machine in the exemplary form of a computer system 200 within which a set of instructions, for causing the machine to perform any one of the methodologies discussed above, may be executed. The computer 12 and servers 26, 28, and 32 may resemble the computer system 200.

In alternative embodiments, the machine may comprise a network router, a network switch, a network bridge, Personal Digital Assistant (PDA), a cellular telephone, a web appliance, Set-Top Box (STB) or any machine capable of executing a sequence of instructions that specify actions to be taken by that machine.

The computer system 200 includes a processor 202, a main memory 204 and a static memory 206, which communicate with each other via a bus 208. The computer system 200 may further include a video display unit 210 (e.g., a liquid crystal display (LCD) or a cathode ray tube (CRT)). The computer system 200 also includes an alphanumeric input device 212 (e.g., a keyboard), a cursor control device 214 (e.g., a mouse), a disk drive unit 216, a signal generation device 218 (e.g., a speaker) and a network interface device 220.

The disk drive unit 216 includes a machine-readable medium 222 on which is stored a set of instructions (software) 224 embodying any one, or all, of the methodologies described above. The software 224 is also shown to reside, completely or at least partially, within the main memory 204 and/or within the processor 202. The software 224 may further be transmitted or received via the network interface device 220. For the purposes of this specification, the term "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. While the machine-readable medium may reside on a single machine, it is also to be appreciated that it may reside on more than one machine in a distributed fashion.

Thus, a method and system for monitoring user interaction with a computer have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method to monitor interaction between a user and a computer, the method including:
    generating an image including, in a random fashion, a random reference data readable by the user, the random reference data comprising a random reference string, the random reference string comprising a plurality of numerical digits;
    communicating the image to the computer for display to the user;
    receiving user input data; and
    comparing the random reference data and the user input data to determine if the user is interacting with the computer, wherein the including of the random reference data includes one of randomly off-centering each digit of the random reference string, providing each digit of the random reference string in a font which is randomly selected, providing each digit of the random reference string in a color which is randomly selected, and adding noise to the image.

2. The method of claim 1, in which including the random reference data in the random fashion includes:
    generating an image modification random number; and
    including a reference number in the image dependent upon the image modification random number.

3. The method of claim 1, which includes:
    generating the random reference string at an application server;
    including the random reference string in the random reference data;
    encrypting the random reference data; and
    communicating the encrypted random reference data to the computer via the Internet in one of a web form, a Uniform Resource Locator (URL) and a cookie.

4. The method of claim 3, which includes communicating the encrypted random reference data to the computer during a registration process, the user input data being required to correspond to the random reference string in order to effect registration.

5. The method of claim 4, which includes Base64 encoding the encrypted random reference data prior to communicating the encrypted random reference data to the computer.

6. The method of claim 3, in which a time stamp is included in the random reference data prior to encrypting the random reference data.

7. The method of claim 6, which includes:
    generating a checksum from the random reference string and the time stamp; and
    encrypting the random reference string, time stamp and checksum to define the random reference data that is communicated to the computer.

8. The method of claim 3, in which the random reference string is included in the image at an image server far serving HTML pages, the method including:
    receiving the encrypted random reference data together with an HTML request for serving an image to a web browser; and
    decrypting the encrypted random reference data to obtain the random reference string.

9. The method of claim 8, which includes Base64 decoding the decrypted random reference data to obtain the random reference data.

10. The method of claim 9, which includes extracting the random reference string from the random reference data to generate the image.

11. A method of generating a random image, the method including:
    receiving encrypted random reference data;
    decrypting the encrypted random reference data to obtain a random reference string;
    including the random reference string in the random image in a random fashion; and
    communicating the random image to a recipient computer, wherein
    the including of the random reference string in the random fashion includes one of randomly off-centering each digit of the random reference string, providing the random reference string in a font which is randomly selected, providing the random reference string in a color which is randomly selected, and adding noise to the random image.

12. The method of claim 11, in which the encrypted random reference data is Base64 encoded, the method including Base64 decoding the encrypted random reference data prior to decryption of the encrypted random reference string.

13. The method of claim 11, in which including the random reference string in the random fashion includes:
    generating an image modification random number; and
    including the random reference string in the random image dependent upon the image modification random number.

14. The method of claim 11, which includes receiving the encrypted random reference data via the Internet in the form of an HTML image call.

15. A machine-readable medium embodying a sequence of instructions that, when executed by a machine, cause the machine to:
    generate an image including, in a random fashion, a random reference data readable by a user,
    communicate the image to a computer for display to the user;
    receive user input data; and
    compare the random reference data and the user input data to determine if the user is interacting with the computer, wherein
    random the reference data is included by one of randomly off-centering each digit from random the reference data, providing each digit from the random reference data in a font which is randomly selected, providing each digit from the random reference data in a color which is randomly selected, and adding noise to the image.

16. The machine-readable medium of claim 15, in which the random reference data includes a random reference string.

17. The machine-readable medium of claim 15, in which the random reference data is included by:
    generating an image modification random number; and
    including a reference number in the image dependent upon the image modification random number.

18. The machine-readable medium of claim 15, in which the machine:
   receives the random reference data as encrypted reference data together with an HTML request for serving an image to a web browser; and
   decrypts the encrypted reference data to obtain the random reference data.

19. A computer system for monitoring user interaction with a computer, the system including at least one server to:
   generate an image including, in a random fashion, random reference data readable by a user, wherein the random reference data includes a random reference string including a plurality of numerical digits;
   communicate the image to the computer for display to the user;
   receive user input data; and
   compare the random reference data and the user input data to determine if the user is interacting with the computer, wherein
   including the random reference data in the random fashion includes one of randomly off-centering each digit from the random reference string, providing each digit from the random reference string in a font which is randomly selected, providing each digit from the random reference string in a color which is randomly selected,, and adding noise to the image.

20. The computer system of claim 19, in which including the random reference data in the random fashion includes:
   generating an image modification random number; and
   including a reference number in the image dependent upon the image modification random number.

21. The computer system of claim 19, in which the random reference data is communicated to the computer during a registration process, the user input data being required to correspond to the random reference data in order to effect registration.

22. The computer system of claim 19, in which a time stamp is included in the random reference data prior to encrypting the random reference data.

23. The computer system of claim 19, in which the computer system:
   receives the random reference data together with an HTML request for serving an image to a web browser; and
   decrypts the random reference data to obtain reference data.

24. A computer system for generating a random image, the system including at least one server to:
   receive encrypted random reference data;
   decrypt the encrypted random reference data to obtain a random reference string;
   include the random reference string in the random image in a random fashion; and
   communicate the random image to a recipient computer, wherein
   the random reference string is included by one of randomly off-centering each digit of the random reference string, providing the random reference string in a font which is randomly selected, providing the random reference string in a color which is randomly selected, and adding noise to the random image.

25. The computer system of claim 24, in which the server:
   generates an image modification random number; and
   includes the random reference string in the random image dependent upon the image modification random number.

26. The computer system of claim 24, wherein the encrypted random reference data is received via the Internet in the form of an HTML image call.

27. A computer system for monitoring user interaction with a computer, the system including:
   means to generate an image including random reference data readable by a user, wherein the random reference data includes a random reference string including a plurality of numerical digits;
   means to communicate the image to the computer for display to the user;
   means to receive user input data; and
   means to compare the random reference data and the user input data to determine if the user is interacting with the computer, wherein the random reference string is included by one of randomly off-centering each digit of the random reference string, providing the random reference string in a font which is randomly selected, providing the random reference string in a color which is randomly selected, and adding noise to the image.

* * * * *

UNITED STATES PATENT AND TRADEMARK OFFICE
CERTIFICATE OF CORRECTION

PATENT NO. : 7,139,916 B2 Page 1 of 1
APPLICATION NO. : 10/186637
DATED : November 21, 2006
INVENTOR(S) : Billingsley et al.

It is certified that error appears in the above-identified patent and that said Letters Patent is hereby corrected as shown below:

In column 6, line 65, delete "included" and insert -- include --, therefor.

In column 6, lines 66–67, after "disks" delete ", and carrier wave signals".

In column 7, line 66, in Claim 8, delete "far" and insert -- for --, therefor.

In column 8, line 46, in Claim 15, after "user" delete "," and insert -- ; --, therefor.

In column 8, line 53, in Claim 15, delete "random the reference" and insert -- the random reference --, therefor.

In column 8, line 54, in Claim 15, delete "random the reference" and insert -- the random reference --, therefor.

In column 9, line 26, in Claim 19, after "selected," delete ",". (Repeated Occurrence)

Signed and Sealed this

Twenty-third Day of January, 2007

JON W. DUDAS
*Director of the United States Patent and Trademark Office*

(12) EX PARTE REEXAMINATION CERTIFICATE (9944th)
United States Patent
Billingsley et al.

(10) Number: US 7,139,916 C1
(45) Certificate Issued: Nov. 15, 2013

(54) METHOD AND SYSTEM FOR MONITORING USER INTERACTION WITH A COMPUTER

(75) Inventors: Eric N. Billingsley, Los Gatos, CA (US); Louis M. Monier, Menlo Park, CA (US)

(73) Assignee: eBay Inc., San Jose, CA (US)

Reexamination Request:
No. 90/012,681, Sep. 15, 2012

Reexamination Certificate for:
Patent No.: 7,139,916
Issued: Nov. 21, 2006
Appl. No.: 10/186,637
Filed: Jun. 28, 2002

Certificate of Correction issued Jan. 23, 2007

(51) Int. Cl.
*G06F 21/36* (2013.01)
*G06Q 99/00* (2006.01)
*G09C 5/00* (2006.01)

(52) U.S. Cl.
USPC .............. 713/182; 726/22; 726/26; 380/255; 382/100; 382/312

(58) Field of Classification Search
None
See application file for complete search history.

(56) References Cited

To view the complete listing of prior art documents cited during the proceeding for Reexamination Control Number 90/012,681, please refer to the USPTO's public Patent Application Information Retrieval (PAIR) system under the Display References tab.

*Primary Examiner* — Hetul Patel (57) ABSTRACT

A method of, and system for, monitoring interaction between a user and a computer is provided. The method includes generating an image including random reference data readable by the user, and communicating the image to the computer for display to the user. User input data is then received and a comparison between the random reference data and the user input data is performed to determine if the user is interacting with the computer.

US 7,139,916 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 11 and 24 is confirmed.

Claims 1, 15, 19 and 27 are cancelled.

New claims 28-38 are added and determined to be patentable.

Claims 2-10, 12-14, 16-18, 20-23, 25 and 26 were not reexamined.

28. *A method to monitor interaction between a user and a computer, the method including:*
*generating an image including, in a random fashion, a random reference data readable by the user, the random reference data comprising a random reference string, the random reference string comprising a plurality of digits;*
*generating an image modification random number;*
*including the random reference string in the image dependent upon the image modification random number;*
*communicating the image to the computer for display to the user;*
*receiving user input data; and*
*comparing the random reference data and the user input data to determine if the user is interacting with the computer,*
*wherein the including of the random reference data includes one of randomly off-centering each digit of the random reference string, providing each digit of the random reference string in a font which is randomly selected, providing each digit of the random reference string in a color which is randomly selected, and adding noise to the image,*
*wherein the including of the random reference data comprises modifying the image based on the image modification random number.*

29. *The method of claim 28, comprising using the image modification random number to select one of a plurality of fonts for each digit in the random reference string.*

30. *The method of claim 29, comprising iteratively generating image modification random numbers.*

31. *The method of claim 28, wherein the image, when rendered, is sufficiently distorted to inhibit acquisition of the random reference string by an automated robot using optical character recognition.*

32. *A method to monitor interaction between a user and a computer, the method including:*
*generating an image including, in a random fashion, a random reference data readable by the user, the random reference data comprising a random reference string, the random reference string comprising a plurality of digits;*
*determining whether the image has been sufficiently distorted;*
*in response to determining that the image has been sufficiently distorted, communicating the image to the computer for display to the user;*
*receiving user input data; and*
*comparing the random reference data and the user input data to determine if the user is interacting with the computer,*
*wherein the including of the random reference data includes distorting the image to inhibit acquisition of the random reference data by an automated robot using optical character recognition, wherein the distorting of the image includes one of randomly off-centering each digit of the random reference string, providing each digit of the random reference string in a font which is randomly selected, providing each digit of the random reference string in a color which is randomly selected, and adding noise to the image.*

33. *A method to monitor interaction between a user and a computer, the method including:*
*generating an image including, in a random fashion, a random reference data readable by the user, the random reference data comprising a random reference string, the random reference string comprising a plurality of digits;*
*communicating the image to the computer for display to the user;*
*receiving a token from the computer, the token comprising user input data and a checksum;*
*using the checksum to validate integrity of the token;*
*comparing the random reference data and the user input data to determine if the user is interacting with the computer,*
*wherein the including of the random reference data includes one of randomly off-centering each digit of the random reference string, providing each digit of the random reference string in a font which is randomly selected, providing each digit of the random reference string in a color which is randomly selected, and adding noise to the image.*

34. *A method to monitor interaction between a user and a computer during a registration process, the method including:*
*generating an image including, in a random fashion, a random reference data readable by the user and associated with a token, the random reference data comprising a random reference string, the random reference string comprising a plurality of digits;*
*communicating the image to the computer for display to the user;*
*receiving user input data;*
*comparing the random reference data and the user input data to determine if the user is interacting with the computer,*
*wherein the including of the random reference data includes one of randomly off-centering each digit of the random reference string, providing each digit of the random reference string in a font which is randomly selected, providing each digit of the random reference string in a color which is randomly selected, and adding noise to the image;*
*determining whether the random reference data matches the user input data;*
*determining whether a count associated with the token is greater than a predetermined number, the count indicating how many times the token has been previously used; and* selectively authenticating the registration process based on whether the count is greater than the predetermined number.

35. A method to monitor interaction between a user and a computer during a registration process, the method including:
   generating an image including, in a random fashion, a random reference data readable by the user and associated with a token, the random reference data comprising a random reference string, the random reference string comprising a plurality of digits;
   communicating the image to the computer for display to the user; receiving user input data;
   comparing the random reference data and the user input data to determine if the user is interacting with the computer,
   wherein the including of the random reference data includes one of randomly off-centering each digit of the random reference string, providing each digit of the random reference string in a font which is randomly selected, providing each digit of the random reference string in a color which is randomly selected, and adding noise to the image;
   determining whether the random reference data matches the user input data;
   determining whether a count associated with the token is greater than a predetermined number; and
   selectively authenticating the registration process based on whether the count is greater than the predetermined number, wherein the selectively authenticating the registration further comprises rejecting authentication request by the user if the value of the count is equal to or greater than three.

36. The method of claim 34, wherein the selectively authenticating the registration process further comprises evaluating an age of the token.

37. A method to monitor interaction between a user and a computer, the method including:
   receiving, from the computer, at an image server, a random reference data in a form of a token, the token comprising a random reference string, a checksum, and a time stamp, the random reference string comprising a plurality of digits;
   generating an image including, in a random fashion, the random reference data readable by the user;
   communicating the image to the computer for display to the user;
   receiving user input data in the form of the token, from the computer;
   authenticating the token via the checksum and timestamp; and
   comparing the random reference data and the user input data to determine if the user is interacting with the computer,
   wherein the including of the random reference data includes one of randomly off-centering each digit of the random reference string, providing each digit of the random reference string in a font which is randomly selected, providing each digit of the random reference string in a color which is randomly selected, and adding noise to the image.

38. A method to monitor interaction between a user and a computer, the method including:
   generating an image including, in a random fashion, a random reference data readable by the user, the random reference data comprising a random reference string, the random reference string comprising a plurality of digits;
   communicating the image to the computer for display to the user;
   receiving user input data;
   comparing the random reference data and the user input data to determine if the user is interacting with the computer,
   wherein the including of the random reference data includes one of randomly off-centering each digit of the random reference string, providing each digit of the random reference string in a font which is randomly selected, providing each digit of the random reference string in a color which is randomly selected, and adding noise to the image; and
   determining whether the image has been fully distorted, and, if the image has not been fully distorted, the including of the random reference data includes another one of randomly off-centering each digit of the random reference string, providing each digit of the random reference string in a font which is randomly selected, providing each digit of the random reference string in a color which is randomly selected, and adding noise to the image.

* * * * *